Patented Apr. 28, 1936

2,038,969

UNITED STATES PATENT OFFICE 2,038,969

SEPARATING ZINC AND CADMIUM IN SULPHATE SOLUTION

Roscoe Teats, Denver, Colo., assignor to American Smelting and Refining Company, New York, N. Y., a corporation of New Jersey No Drawing. Application February 1, 1934, Serial No. 709,326

6 Claims. (Cl. 23—134)

This invention relates to the purification of cadmium sulphate solutions.

In the metallurgy of cadmium, cadmium sulphate solutions are frequently produced which are contaminated with zinc which renders the solution unfit for the production of certain cadmium products. For example, in the manufacture of cadmium sulphide, the product will be off color if zinc is present even in small quantities.

The present invention provides a process for selectively removing zinc from cadmium in sulphate solution without precipitation of excessive amounts of cadmium, thus yielding a cadmium sulphate solution suitable for use in the manufacture of cadmium sulphide or other products.

It has been found that, if potassium ferrocyanide is added to cadmium sulphate solutions contaminated with zinc, the zinc will be precipitated as potassium zinc ferro-cyanide and as such may be removed from the solution. Also, the removal of zinc in this manner is accomplished without the precipitation of excessive amounts of cadmium and without introducing into the solution any impurities which will effect the color or quality of cadmium sulphide precipitated from the zinc-free solution.

The following specific example will serve to illustrate one manner in which the invention may be practiced: The cadmium sulphate solution, contaminated with zinc but from which such impurities as arsenic, bismuth, lead, mercury and the like have been removed as by precipitation with cadmium sulphide, is placed in a suitable boiling tank and preferably brought to a concentration of approximately 200 to 240 grams per liter of cadmium. Potassium ferrocyanide is then slowly added to the boiling cadmium sulphate solution (which may be neutral or slightly acid) until the precipitation of zinc is complete. The solution may then be filtered in a filter press to remove the insoluble potassium zinc ferro-cyanide and thereafter transferred to the cadmium sulphide plant.

The purified cadmium sulphate solution is then reduced to the proper cadmium concentration, sufficient acid is added to impart the proper acidity to the solution and cadmium sulphide precipitated by passing hydrogen sulphide through the solution. The cadmium sulphide may then be washed, dried, pulverized and packed for use.

By thus providing a process by which zinc can be readily and economically removed from cadmium sulphate solutions, the invention effects marked economies in the manufacture of such products as cadmium sulphide. The amount of $K_4FeCN_6 \cdot 3H_2O$ necessary to effect the removal of zinc from a cadmium sulphate solution will depend, of course, upon the concentration of zinc contained therein. However, inasmuch as the concentration of zinc in cadmium sulphate solutions ordinarily encountered in commercial operations is generally less than 15 grams per liter in a cadmium solution having a concentration of 200 to 250 grams per liter of cadmium, it will be appreciated that the invention is of decided commercial importance, particularly in the manufacture of products whose quality is detrimentally effected by the presence of zinc.

While certain novel features of the invention have been disclosed and are pointed out in the annexed claims, it will be understood that various omissions, substitutions and changes may be made by those skilled in the art without departing from the spirit of the invention.

What is claimed is:

1. The process of manufacturing cadmium sulphide from cadmium sulphate solution contaminated with zinc which comprises adding potassium ferro-cyanide to such solution, filtering same and precipitating cadmium sulphide from the filtrate by passing hydrogen sulphide therethrough.

2. In the manufacture of cadmium sulphide from cadmium sulphate solution contaminated with zinc, the step which comprises precipitating zinc from the solution by potassium ferrocyanide.

3. The process of separating zinc from cadmium in sulphate solution which comprises adding potassium ferro-cyanide to the solution thereby precipitating zinc as potassium zinc ferro-cyanide.

4. The process of separating zinc from cadmium in sulphate solution which comprises boiling the solution and adding thereto sufficient potassium ferro-cyanide solution to precipitate the zinc.

5. The process for treating a cadmium-zinc solution which comprises adding sufficient potassium ferrocyanide to the solution to precipitate zinc as potassium zinc ferrocyanide and separating said precipitate from the solution.

6. The process for purifying a cadmium solution with respect to zinc as a contaminant which comprises selectively precipitating the zinc as potassium zinc ferrocyanide and thereafter effecting a separation between the precipitate and the purified solution.

ROSCOE TEATS.